US012657757B2

(12) United States Patent (10) Patent No.: US 12,657,757 B2
Urfalioglu et al. (45) Date of Patent: Jun. 16, 2026

(54) SAMPLING BASED SELF-SUPERVISED DEPTH AND POSE ESTIMATION

(71) Applicant: HUAWEI TECHNOLOGIES CO., LTD., Shenzhen (CN)

(72) Inventors: Onay Urfalioglu, Munich (DE); Akhil Gurram, Munich (DE); Ibrahim Halfaoui, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 450 days.

(21) Appl. No.: 18/315,325

(22) Filed: May 10, 2023

(65) Prior Publication Data

US 2023/0281862 A1 Sep. 7, 2023

Related U.S. Application Data

(63) Continuation of application No. PCT/EP2020/081580, filed on Nov. 10, 2020.

(51) Int. Cl.
*G06T 7/70* (2017.01)
*G06T 7/55* (2017.01)

(52) U.S. Cl.
CPC .................. *G06T 7/70* (2017.01); *G06T 7/55* (2017.01); *G06T 2207/20081* (2013.01); *G06T 2207/20084* (2013.01); *G06T 2207/30244* (2013.01)

(58) Field of Classification Search
None
See application file for complete search history.

(56) References Cited

U.S. PATENT DOCUMENTS

2021/0319577 A1* 10/2021 Tang ........................ G06T 19/00
2021/0398302 A1* 12/2021 Guizilini ................... G06T 7/50
2022/0011778 A1* 1/2022 Chidlovskii ............ G06T 7/136

OTHER PUBLICATIONS

Almalioglu et al., "SelfVIO: Self-Supervised Deep Monocular Visual-Inertial Odometry and Depth Estimation," arXiv:1911. 09968v2 [cs.CV], pp. 1-18 (Jul. 23, 2020). (Year: 2020).*
Godard et al., "Unsupervised Monocular Depth Estimation with Left-Right Consistency," Visual Computing, University College London, http://visual.cs.ucl.ac.uk/pubs/monoDepth/, Total 4 pages (2017).

(Continued)

*Primary Examiner* — Leon Viet Q Nguyen
(74) *Attorney, Agent, or Firm* — Leydig, Voit & Mayer, Ltd.

(57) ABSTRACT

A method estimates a camera pose change estimation. The method includes capturing a first image of a scene with a first camera, obtaining a depth map with respect to the first camera based on the first image, capturing a second image of the scene with a second camera. The method also includes obtaining a pose change from the first camera pose to the second camera pose based on the first image and the second image, generating a set of additional pose changes based on the pose change, obtaining a set of reconstructed images and, matching each reconstructed image of the set of reconstructed images with the second image. The method selects a camera pose change estimation from the pose change and the set of additional pose changes that corresponds to a best matching reconstructed image.

20 Claims, 6 Drawing Sheets

(56)　　　　　　References Cited

OTHER PUBLICATIONS

Almalioglu et al., "SelfVIO: Self-Supervised Deep Monocular Visual-Inertial Odometry and Depth Estimation," arXiv:1911.09968v2 [cs.CV], pp. 1-18 (Jul. 23, 2020).

Godard et al., "Digging Into Self-Supervised Monocular Depth Estimation," arXiv:1806.01260v4 [cs.CV], Total 18 pages (Aug. 17, 2019).

Wang et al., "Adversarial Learning for Joint Optimization of Depth and Ego-Motion," IEEE Transactions on Image Processing, vol. 29, pp. 4130-4142, Institute of Electrical and Electronics Engineers, New York, New York (Jan. 2020).

* cited by examiner

100

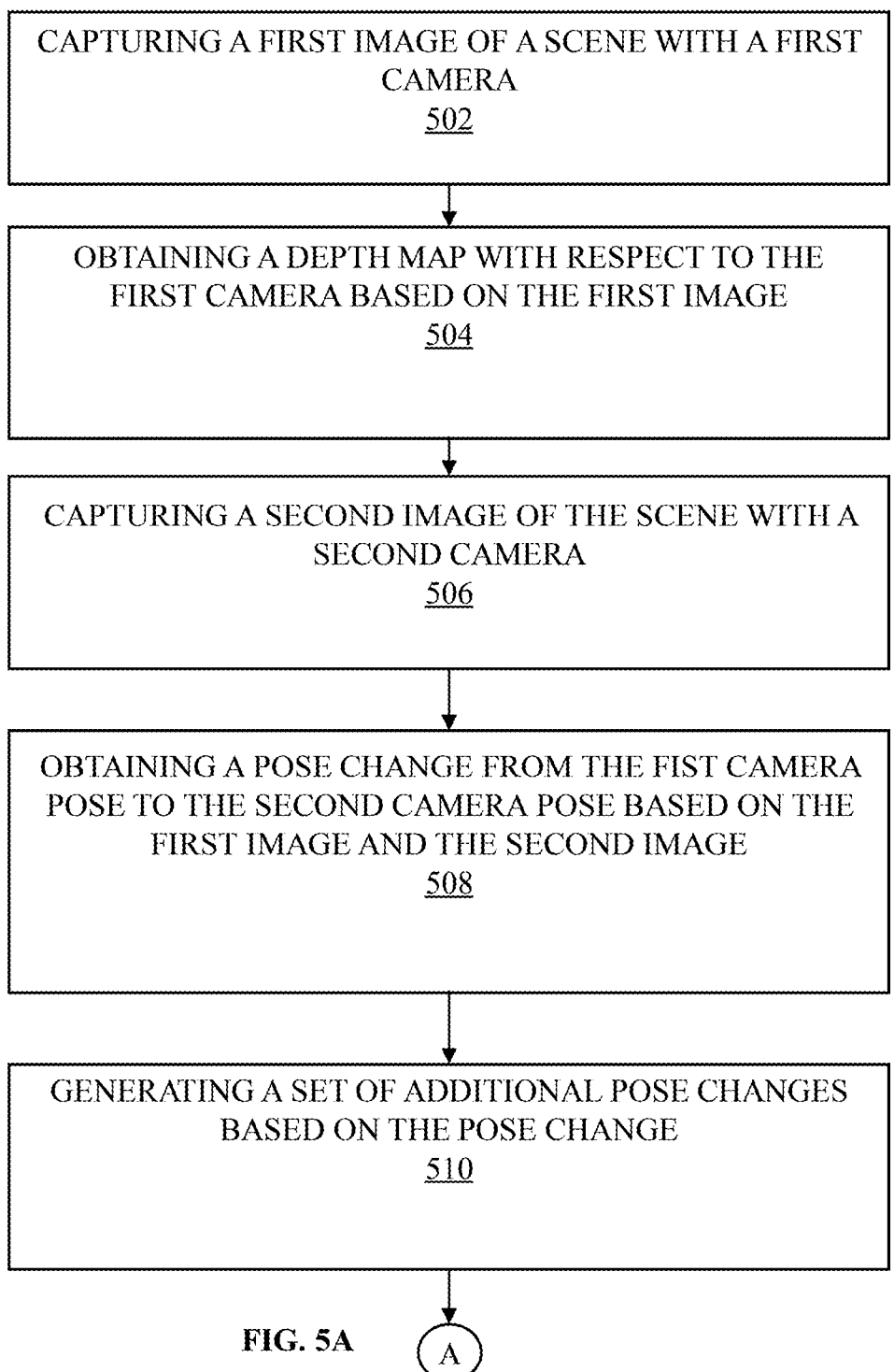

CAPTURING A FIRST IMAGE OF A SCENE WITH A FIRST CAMERA
502

OBTAINING A DEPTH MAP WITH RESPECT TO THE FIRST CAMERA BASED ON THE FIRST IMAGE
504

CAPTURING A SECOND IMAGE OF THE SCENE WITH A SECOND CAMERA
506

OBTAINING A POSE CHANGE FROM THE FIST CAMERA POSE TO THE SECOND CAMERA POSE BASED ON THE FIRST IMAGE AND THE SECOND IMAGE
508

GENERATING A SET OF ADDITIONAL POSE CHANGES BASED ON THE POSE CHANGE
510

SAMPLING BASED SELF-SUPERVISED DEPTH AND POSE ESTIMATION

CROSS-REFERENCE TO RELATED APPLICATIONS

This application is a continuation of International Application No. PCT/EP2020/081580, filed on Nov. 10, 2020, the disclosure of which is hereby incorporated by reference in its entirety.

FIELD

The present disclosure relates generally to mapping and localization, and more particularly, the present disclosure relates to a method of a camera pose change estimation.

BACKGROUND

Depth estimation and pose estimation are requirements for certain autonomous systems such as advanced driver assistance systems or mobile robots. The depth and the pose estimation are key components for carrying out certain tasks such as obstacle avoidance, route planning, mapping, localization, pedestrian detection, and human-robot interaction. The depth estimation and the pose estimation are traditionally performed by expensive active sensing systems such as Light Detection and Ranging (LIDAR) sensors or passive sensing systems such as binocular vision or stereo cameras.

Existing technology implements depth estimation methods which uses deep learning models and/or a supervised learning model. However, the pose estimate and depth map estimation are not accurate as the depth estimation is performed using state of the art deep learning models. In the supervised learning model, computation of ground truth depth and the pose estimation in high quality is difficult and crucial to have. For example, a Convolutional Neural Network (CNN) based supervised learning model estimates depth and poses without the ground truth depth. The supervised learning model is violated while the depth estimation is performed on dynamic real-world scenes.

An existing method employs a deep learning model to estimate a pose change from an image 1 and an image 2 and calculates the depth map from the image 2 only. Using the estimated pose change and the depth map, the image 2 is reconstructed and then compared with the native image 2. In the existing method, the depth estimation and the pose estimation are performed independently and a loss function is computed. The loss function is computed based on an image similarity between a native image 2 and its reconstruction. This leads to the evaluation of the correctness of both the pose change estimation and the depth map estimation as the depth estimation and the pose estimation are interlinked and typically enable a better estimate of the other.

Therefore, the inventors have recognized that there arises a need to address the aforementioned technical drawbacks in existing systems or technologies in the depth and pose estimations.

SUMMARY

Aspects of the present disclosure provide a method of a camera pose estimation with dynamic real-world scenes to provide effective mapping and localization in autonomous systems by improving a depth estimation.

The present disclosure provides a method of camera pose change estimation.

According to a first aspect, there is provided a method of a camera pose change estimation. The method includes capturing a first image of a scene with a first camera. The method includes obtaining a depth map with respect to the first camera based on the first image. The method includes capturing a second image of the scene with a second camera. The method includes obtaining a pose change from the first camera pose to the second camera pose based on the first image and the second image. The method includes generating a set of additional pose changes based on the pose change. The method includes obtaining a set of reconstructed images using the first image, the depth map, the pose change, and the set of additional pose changes. The method includes matching each of the reconstructed images with the second image. The method includes selecting a camera pose change estimation among the pose change and the set of additional pose changes that corresponds to a best matching reconstructed image.

The method improves the accuracy of both the camera pose change estimation and the depth map estimation. The method provides improved camera pose change estimation due to its sampling nature, which in turn leads to improved depth map estimation. The method improves a training and an application process of the camera pose change estimation by implementing a sampling approach to the camera pose change estimation. This sampling approach generates the additional pose changes using neural networks (e.g. a deep learning model) to improve the camera pose change estimation and the depth map estimation. The camera pose change estimation and the depth map estimation help in mapping and localization of robots, advanced driver-assistance systems (ADAS), self-driving systems, or automated systems.

In a first possible implementation form, the step of matching each of the reconstructed images with the second image comprises calculating a reconstruction loss for each of the reconstructed images.

In a second possible implementation form, the best matching reconstructed image is defined by a lowest reconstruction loss. In a third possible implementation form, the step of generating the set of additional pose changes based on the pose change comprises sampling a Gaussian distribution centered at the pose change. Said generation step involves a limited amount of additional computations, while it is likely that better pose estimates can be generated due to the nature of the sampling. Thereby, the set of additional pose changes that are generated helps to improve the accuracy of the camera pose change estimation.

In a fourth possible implementation form, the second camera is the first camera that has changed its pose. In a fifth possible implementation form, the method is used for training a neural network configured to obtain the depth map with respect to the first camera based on the first image. The method further includes updating parameters of the neural network if the selected camera pose change estimation and/or the best matching reconstructed image do not correspond to a predetermined condition and returning to the step of obtaining the depth map to obtain an updated depth map.

In a sixth possible implementation form, the method is used for training a neural network configured to obtain the pose change from the first camera pose to the second camera pose. The method further includes updating parameters of the neural network if the selected camera pose change estimation and/or the best matching reconstructed image do not correspond to a predetermined condition and returning to the step of obtaining the pose change to obtain an updated pose change.

The neural network is trained on video sequences (e.g., by capturing typical traffic scenarios) to obtain a trained neural network. The trained neural network performs the camera pose change estimation without any pre-established inputs and output patterns. The trained neural network performs the depth map estimation in real-time without affecting the camera pose change estimation.

A technical problem in the prior art is resolved, where the technical problem is that estimation of the effective improved ground truth depth map and camera pose change using a supervised learning model.

Therefore, in contradistinction to the prior art, according to the method for providing the effective mapping and localization that is provided in the present disclosure, the camera pose change, and the depth map are estimated with an improved accuracy. The method provides improved camera pose change estimation due to its sampling nature, which in turn leads to improved depth map estimation. The method improves a training process and an application process of the camera pose change estimation by implementing a sampling approach to the camera pose change estimation. This sampling approach generates the additional pose changes using neural networks (e.g. a deep learning model) to improve the camera pose change estimation and the depth map estimation. The camera pose change estimation and the depth map estimation help in mapping and localization of robots, advanced driver-assistance systems (ADAS), self-driving systems, or automated systems.

These and other aspects of the present disclosure will be apparent from and the implementation(s) described below.

BRIEF DESCRIPTION OF DRAWINGS

Implementations of the present disclosure will now be described, by way of example only, with reference to the accompanying drawings, in which:

FIGS. 5A and 5B are flow diagrams that illustrate a method of a camera pose change estimation in accordance with an implementation of the present disclosure.

DETAILED DESCRIPTION

Implementations of the present disclosure provide a method of a camera pose estimation with dynamic real-world scenes to provide effective mapping and localization in autonomous systems by improving a depth estimation.

To make solutions of the present disclosure more comprehensible for a person skilled in the art, the following implementations of the present disclosure are described with reference to the accompanying drawings.

Terms such as "a first", "a second", "a third", and "a fourth" (if any) in the summary, claims, and foregoing accompanying drawings of the present disclosure are used to distinguish between similar objects and are not necessarily used to describe a specific sequence or order. It should be understood that the terms so used are interchangeable under appropriate circumstances, so that the implementations of the present disclosure described herein are, for example, capable of being implemented in sequences other than the sequences illustrated or described herein. Furthermore, the terms "include" and "have" and any variations thereof, are intended to cover a non-exclusive inclusion. For example, a process, a method, a system, a product, or a device that includes a series of steps or units, is not necessarily limited to expressly listed steps or units but may include other steps or units that are not expressly listed or that are inherent to such process, method, product, or device.

Figure 1:
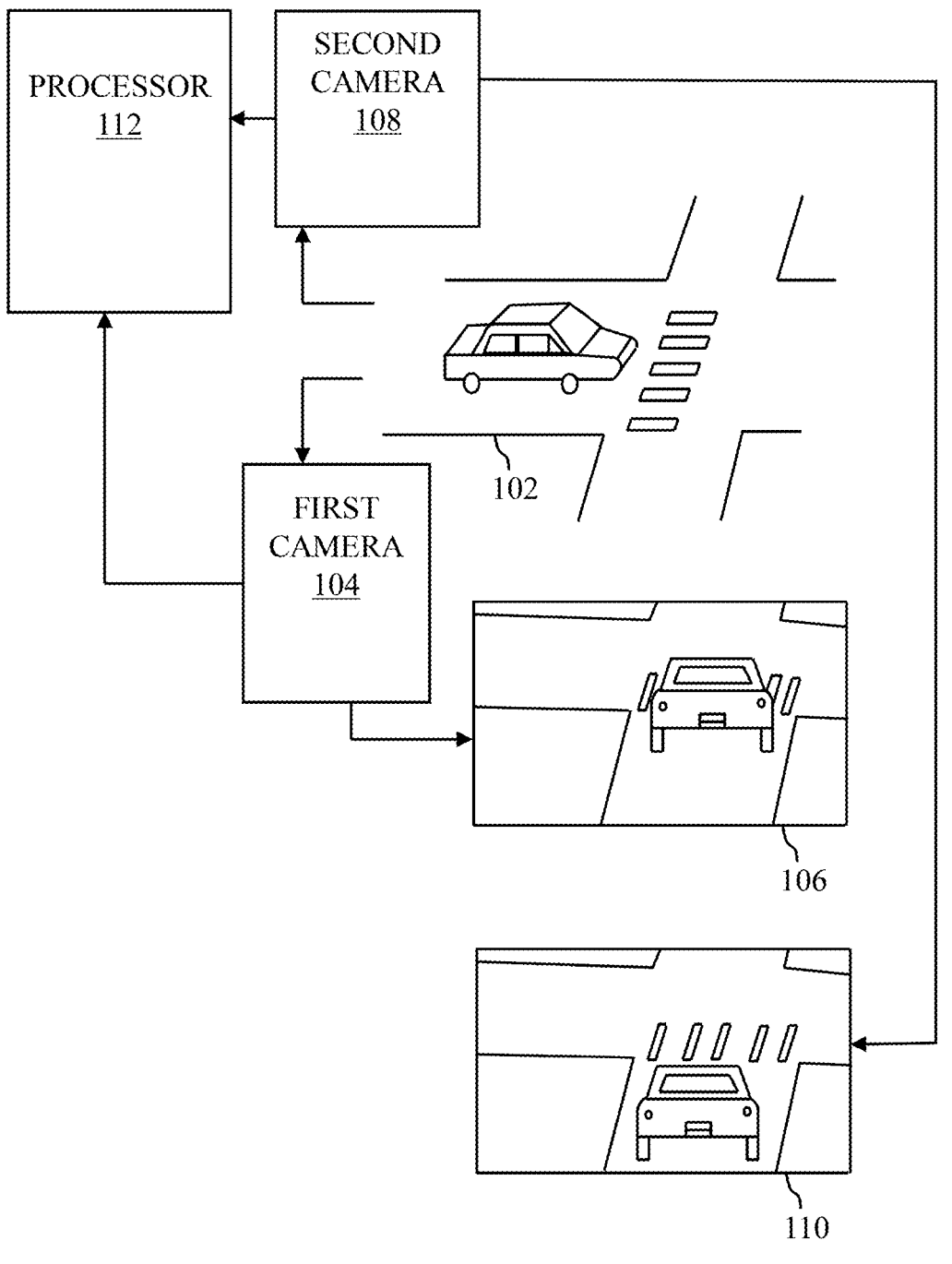
FIG. 1 is a block diagram of a system for a camera pose change estimation in accordance with an implementation of the present disclosure.

FIG. 1 is a block diagram of a system 100 for a camera pose change estimation in accordance with an implementation of the present disclosure. The system 100 includes a first camera 104, a second camera 108, and a processor 112. The first camera 104 captures a first image 106 of a scene 102. The processor 112 executes a deep learning model and obtains a depth map based on the first image 106 with respect to the first camera 104. The second camera 108 captures a second image 110 from the scene 102. The processor 112 obtains a pose change from the first camera pose to the second camera pose based on the first image 106 and the second image 110. The processor 112 generates a set of additional pose changes based on a pose change. The processor 112 generates a set of reconstructed images that is obtained using the first image 106, the depth map, the pose change, and the set of additional pose changes. The processor 112 matches each of the reconstructed images with the second image 110. The processor 112 selects a camera pose change estimation among the pose change and the set of additional pose changes that corresponds to a best matching reconstructed image.

The system 100 improves the accuracy of both the camera pose change estimation and the depth map estimation. The system 100 provides improved camera pose change estimation due to its sampling nature, which in turn leads to improved depth map estimation. The system 100 improves a training and an application process of the camera pose change estimation by implementing a sampling approach to the camera pose change estimation. This sampling approach generates the additional pose changes using neural networks (e.g. a deep learning model) to improve the camera pose change estimation and the depth map estimation. The camera pose change and the depth map estimated by the system 100 help in mapping and localization of robots, advanced driver-assistance systems (ADAS), self-driving systems, or automated systems.

The first camera 104 and the second camera 108 optionally capture the first image 106 and the second image 110 of the scene 102 respectively from real-time images or videos. The first image 106 and the second image 110 may be captured by visual sensors. The first image 106 and the second image 110 may be 2-dimensional images of the scene 102. The 2-dimensional image optionally includes Red Green Blue (RGB) or chrominance-luminance image. The 2-dimensional image includes 3-dimensional points associated with an object (e.g. a vehicle) in the scene 102. The scene 102 may include a certain region of interest of a real-world that is seen or captured by at least one of the first camera 104 or the second camera 108.

The first camera 104 optionally captures the first image 106 using the first camera pose. The second camera 108 optionally captures the second image 110 in the second camera pose. A pose is a 6-dimensional vector that includes 3-dimensional location coordinates (x, y, z) and 3 angles for orientation of an object (e.g. the vehicle) in the scene 102. A relative pose is optionally generated during the camera pose change estimation. The relative pose is a Euclidian transform of one pose to another pose. The deep learning model (e.g. a neural network) parameters are estimated or trained using a dataset. The deep learning model that is trained using the dataset optionally provides outputs (e.g. the camera pose change estimation and the depth map estimation) based on inputs. The depth map is optionally a 2D image/matrix where each pixel/element depicts the depth of a corresponding 3D point in the scene 102 with respect to the first camera 104 and the second camera 108.

In a first implementation, the set of additional pose changes is generated based on the pose change that includes sampling a Gaussian distribution centered at the pose change. In a second implementation, the second camera 108 is the first camera 104 that has changed its pose. In the first image 106 and the second image 110, each pixel in the 2-dimensional image depicts a depth of corresponding 3-dimensional points (i.e. depth map) associated with objects in the scene 102. In an example implementation, pixels in the 2-dimensional image that depicts a disparity of those pixels which is called as the depth map. The disparity is a difference in x-coordinates of a projection of the scene 102 into a stereo camera image pair (left, right): I_left (x+d)=I_right (x).

Figure 2:
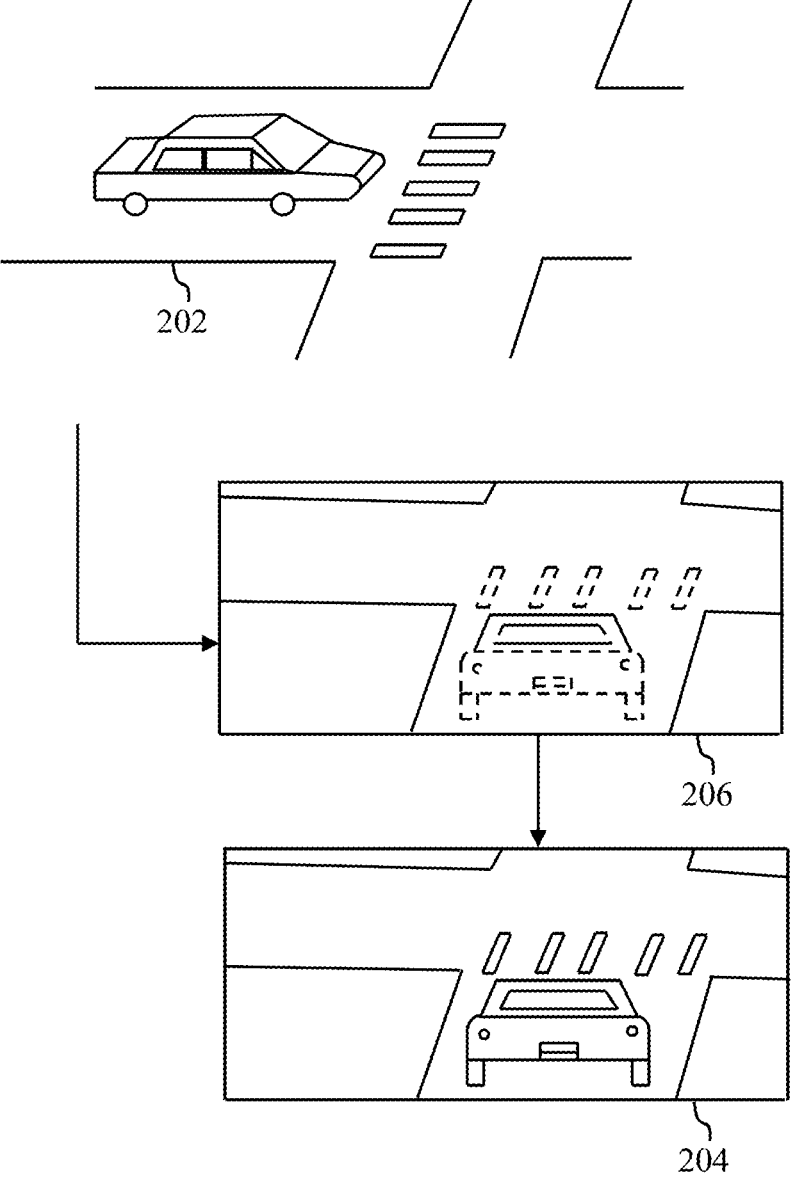
FIG. 2 illustrates an exemplary reconstructed image from a scene in accordance with an implementation of the present disclosure.

FIG. 2 illustrates an exemplary reconstructed image 204 from a scene 202 in accordance with an implementation of the present disclosure. The scene 202 includes objects that are represented in 2-dimensional image using 3-dimensional points associated with objects in the scene 202. The scene 202 may be captured using at least one of a first camera, a second camera, or visual sensors. A first image is captured by the first camera and a second image is captured by the second camera. The first image and the second image may represent the scene 202 in different poses. The reconstructed image 204 is optionally obtained by processing at least one of an input image 206 (i.e. the first image) which represents the 3-dimensional points associated with the objects in the scene 202, a depth map, pose changes, or a set of additional pose images. The reconstructed image 204 may be obtained using a neural network or image processing techniques. The reconstructed image 204 is optionally matched with an image (i.e. a second image) for selecting a camera pose change estimation.

In a first implementation, the matching of the reconstructed image 204 with the second image includes a calculation of a reconstruction loss for the reconstructed image 204. In a first implementation, the best matching reconstructed image is defined by a lowest reconstruction loss. The reconstruction loss is a function that evaluates a finite model estimation for the camera pose change estimation. A loss is a scalar representation of the function that evaluates the finite model estimation for the camera pose change estimation.

Figure 3:
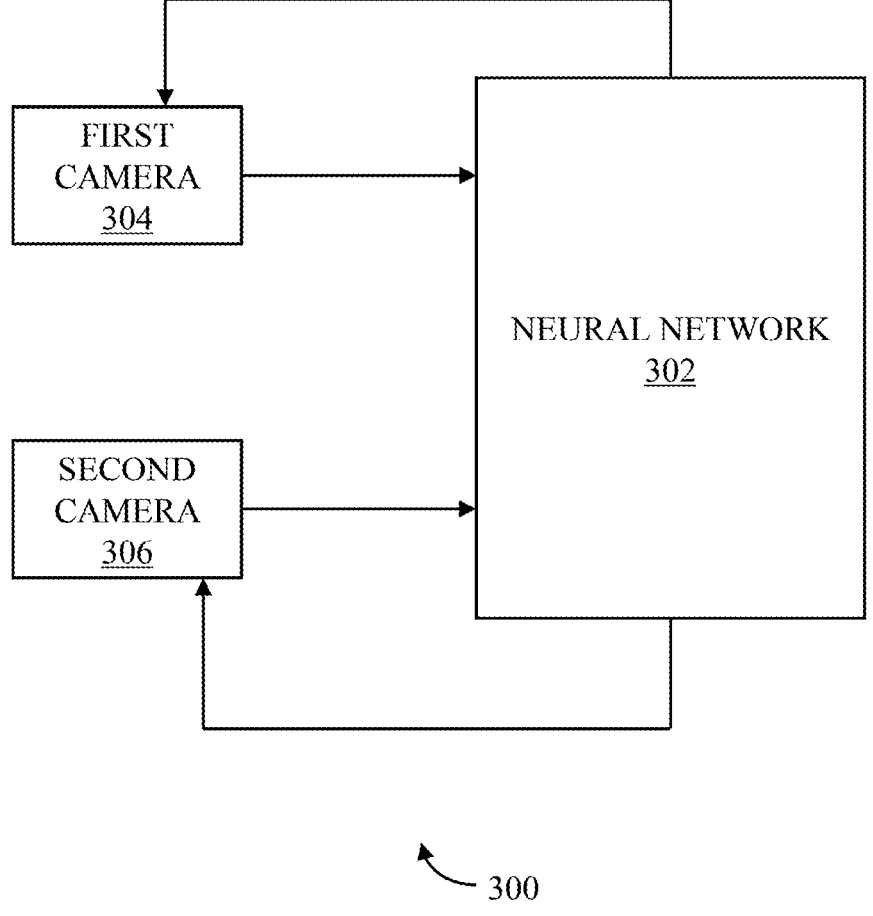
FIG. 3 is an exemplary block diagram of a neural network that estimates a camera pose change in accordance with an implementation of the present disclosure.

FIG. 3 is an exemplary block diagram 300 of a neural network 302 that estimates a camera pose change in accordance with an implementation of the present disclosure. The neural network 302 is connected with a first camera 304 and a second camera 306. In a first implementation, the neural network 302 is trained and is configured to obtain a depth map with respect to the first camera 304 based on a first image. The neural network 302 is configured to update its parameters if the selected camera pose change estimation and/or a best matching reconstructed image do not correspond to a predetermined condition and is returned to obtain an updated depth map. The neural network 302 is optionally trained with historical depth maps and best matching reconstructed images with respect to the first camera 304 as an input to obtain a trained neural network.

In a second implementation, the neural network 302 is trained and is configured to obtain a pose change from a first camera pose to a second camera pose. The neural network 302 is configured to update its parameters if the selected camera pose change estimation and/or the best matching reconstructed image do not correspond to a predetermined condition and is returned to obtain an updated pose change. The pose change is optionally obtained by analyzing the first image captured by the first camera 304 and a second image captured by the second camera 306. The neural network 302 is optionally trained with historical pose changes and the best matching reconstructed images with respect to the first camera 304 to obtain the trained neural network. In an example implementation, the neural network 302 is a deep learning model that is trained using a dataset associated with the depth maps, the best matching reconstructed images, and the pose changes. The deep learning model is provided with a set of inputs of the depth maps, the best matching reconstructed images, and the pose changes associated with the first image and the second image for obtaining an output associated with the camera pose change estimation.

Figure 4:
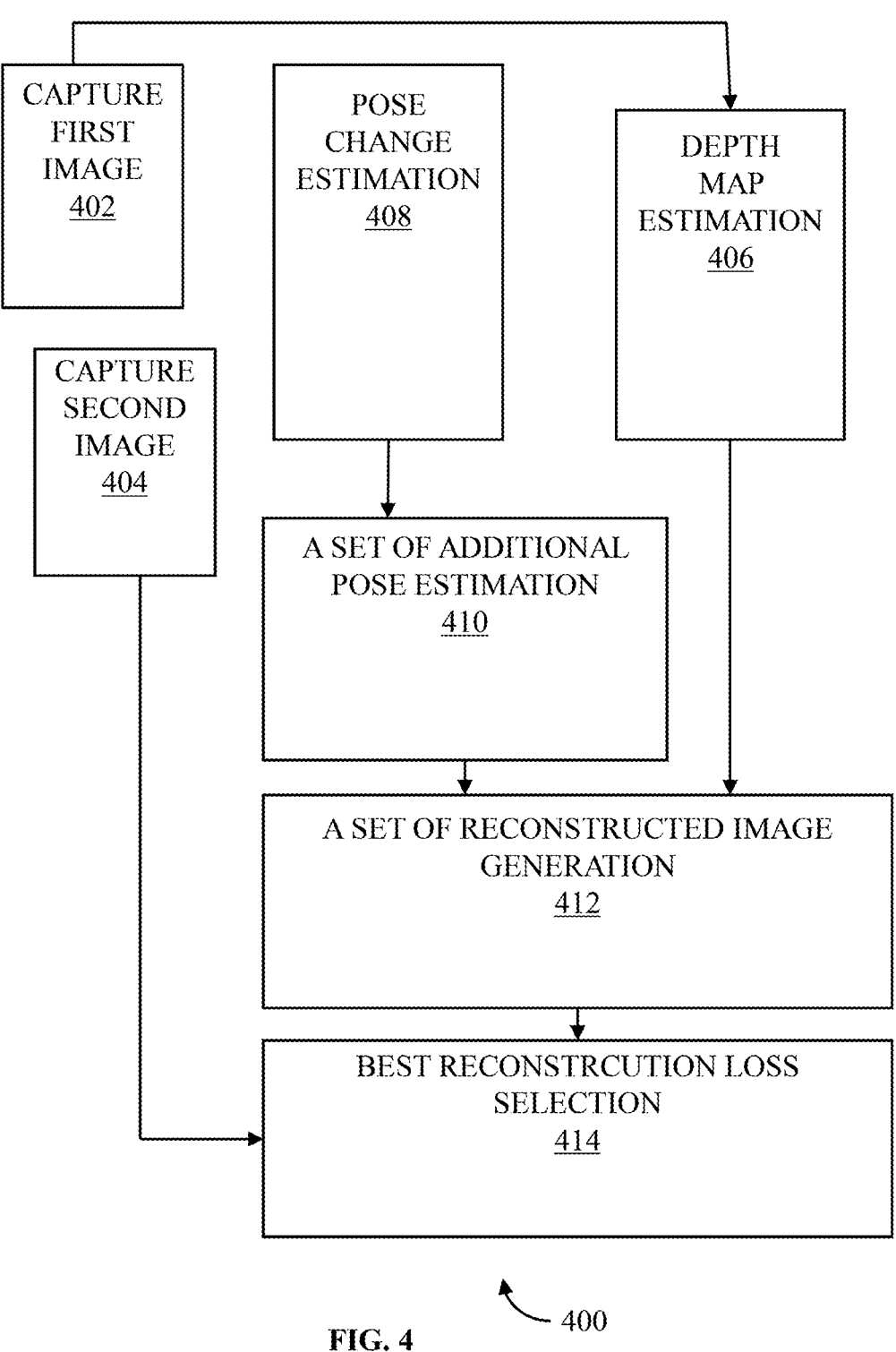
FIG. 4 is an exemplary flow diagram that illustrates a process of a camera pose change estimation in accordance with an implementation of the present disclosure.

FIG. 4 is an exemplary flow diagram 400 that illustrates a process of a camera pose change estimation in accordance with an implementation of the present disclosure. At a step 402, a first image of a scene is captured with a first camera. At a step 404, a second image of the scene is captured with a second camera. At a step 406, a depth map is calculated with respect to the first camera based on the first image. At a step 408, a pose change from the first camera pose to the second camera pose is estimated based on the first image and the second image. At a step 410, a set of additional pose changes is generated based on the estimated pose change obtained from the step 408. At a step 412, a set of reconstructed images is generated using the first image, the pose change, the set of additional pose changes, and the depth map. At a step 414, the set of reconstructed images is matched with the second image, and a camera pose change estimation is selected among the pose changes and the set of additional pose changes that correspond to a best matching the set of reconstructed images.

In an example implementation, the set of additional pose changes are generated using a Gaussian distribution centered at an initial estimated pose change (P) obtained from the step 408. For example, P=(30 cm in x-direction, 2 cm in y-direction)=(30, 2), and the possible additional pose change may be: (28, 3), (33, 1), (26, 4), (29, −1), etc.

Figure 5B:
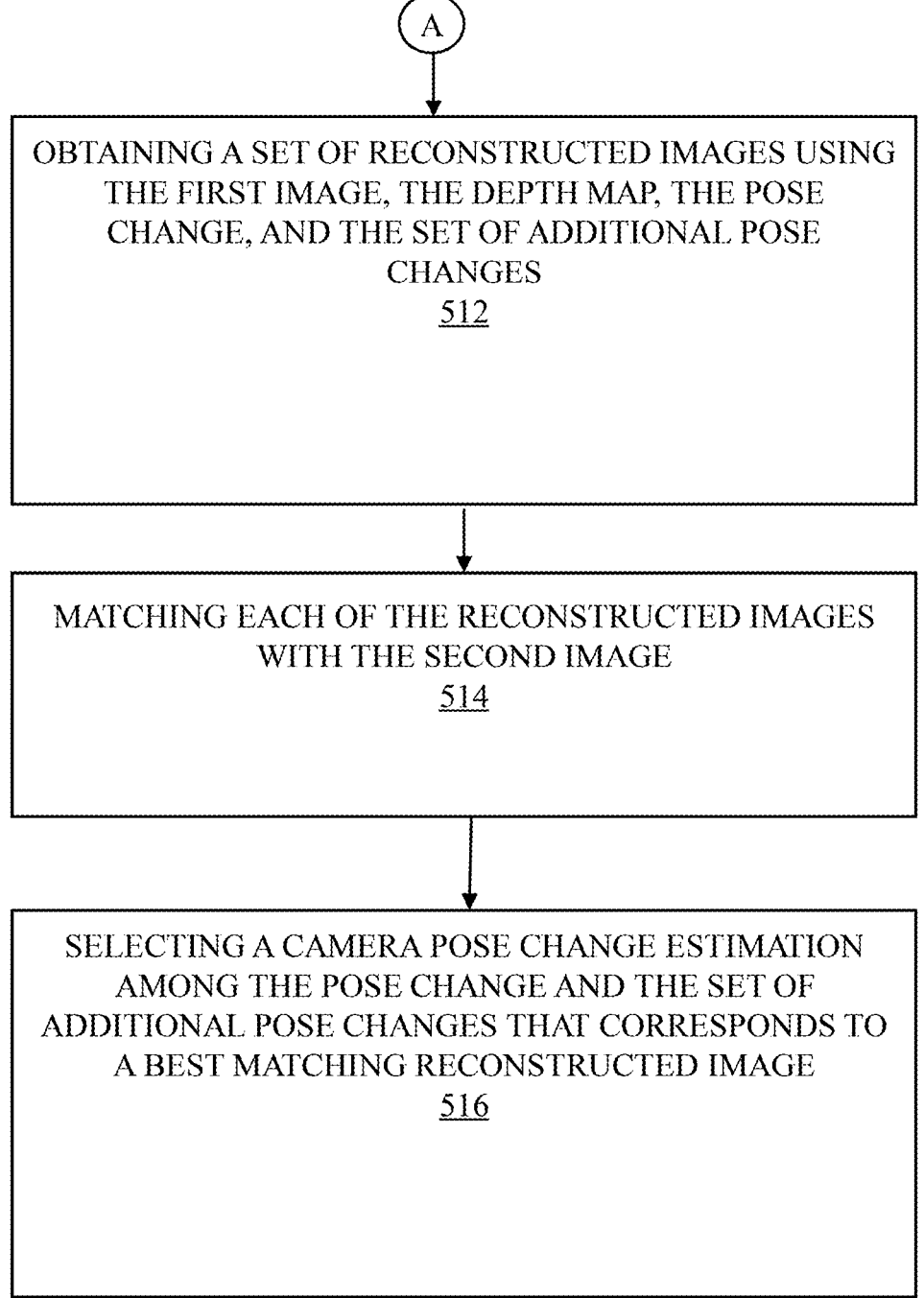

FIGS. 5A and 5B are flow diagrams that illustrate a method of a camera pose change estimation in accordance with an implementation of the present disclosure. At a step 502, a first image of a scene is captured with a first camera. At a step 504, a depth map with respect to the first camera is obtained based on the first image. At a step 506, a second image of the scene is captured with a second camera. At a step 508, a pose change from the first camera pose to the second camera pose is obtained based on the first image and the second image. At a step 510, a set of additional pose changes is generated based on the pose change. At a step 512, a set of reconstructed images is obtained using the first image, the depth map, the pose change, and the set of additional pose changes. At a step 514, each of the reconstructed images is matched with the second image. At a step 516, a camera pose change estimation is selected among the pose change and the set of additional pose changes that corresponds to a best matching reconstructed image.

In a first implementation, the step of matching each of the reconstructed images with the second image that includes calculating a reconstruction loss for each of the reconstructed images. The best matching reconstructed image may be defined by a lowest reconstruction loss. The reconstructed loss is optionally a scalar that depicts a function which evaluating model estimations that fit to target values.

In a second implementation, the step of generating the set of additional pose changes based on the pose change that comprises sampling a Gaussian distribution centered at the pose change. The second camera is optionally the first camera that has changed its pose.

In a third implementation, the method is used for training a neural network that is configured to obtain the depth map with respect to the first camera based on the first image. The method further comprises updating parameters of the neural network if the selected camera pose change estimation and/or the best matching reconstructed image do not correspond to a predetermined condition and returning to the step of obtaining the depth map to obtain an updated depth map. In a fourth implementation, the method is used for training a neural network that is configured to obtain the pose change from the first camera pose to the second camera pose. The method further comprises updating parameters of the neural network if the selected camera pose change estimation and/or the best matching reconstructed image do not correspond to a predetermined condition and returning to the step of obtaining the pose change to obtain an updated pose change.

The method improves the accuracy of both the camera pose change estimation and the depth map estimation. The method provides improved camera pose change estimation due to its sampling nature, which in turn leads to improved depth map estimation. The camera pose change estimation and the depth map estimation help in mapping and localization of robots, advanced driver-assistance systems (ADAS), self-driving systems, or automated systems.

Although the present disclosure and its advantages have been described in detail, it should be understood that various changes, substitutions, and alterations can be made herein without departing from the spirit and scope of the present disclosure as defined by the appended claims.

What is claimed is:

1. A method of a camera pose change estimation, the method comprising:
capturing a first image of a scene with a first camera;
obtaining a depth map with respect to the first camera based on the first image;
capturing a second image of the scene with a second camera;
obtaining a pose change from a first camera pose to a second camera pose based on the first image and the second image;
generating a set of additional pose changes based on the pose change, wherein generating the set of additional pose changes based on the pose change comprises sampling a Gaussian distribution centered at the pose change;
obtaining a set of reconstructed images using the first image, the depth map, the pose change, and the set of additional pose changes;
matching each reconstructed image of the set of reconstructed images with the second image; and selecting a camera pose change estimation from the pose change and the set of additional pose changes that corresponds to a best matching reconstructed image.

2. The method of claim 1, wherein the step of matching each of the reconstructed images with the second image comprises calculating a reconstruction loss for each of the reconstructed images.

3. The method of claim 2, wherein the best matching reconstructed image is defined by a lowest reconstruction loss.

4. The method of claim 1, wherein the second camera is the first camera with a changed pose.

5. The method of claim 1, wherein the method is further for training a neural network that is configured to obtain the depth map with respect to the first camera based on the first image, and the method further comprises
updating parameters of the neural network based on determining that the selected camera pose change estimation and/or the best matching reconstructed image does not correspond to a predetermined condition; and
iternatively returning to the step of obtaining the depth map to obtain an updated depth map.

6. The method of claim 1, wherein the method is further for training a neural network that is configured to obtain the pose change from the first camera pose to the second camera pose, and the method further comprises:
updating parameters of the neural network based on determining that the selected camera pose change estimation and/or the best matching reconstructed image does not correspond to a predetermined condition; and
iteratively returning to the step of obtaining the pose change to obtain an updated pose change.

7. The method of claim 1, wherein the first image and the second image are captured from videos captured by the first camera and the second camera respectively.

8. The method of claim 1, wherein the camera pose change estimation and the depth map are used to map and localize robots.

9. The method of claim 1, wherein the first camera pose is a six-dimensional (6D) vector that includes three-dimensional (3D) location coordinates and three (3) angles for orientation of an object.

10. The method of claim 1, wherein the depth map is a two-dimensional (2D) matrix where each element of the 2D matrix depicts a depth of a corresponding three-dimensional (3D) point in the scene with respect to the first camera and the second camera.

11. A system of a camera pose change estimation, the system comprising:
a first camera configured to capture a first image of a scene;
a second camera configured to capture a second image of the scene; and
a processor configured to:
obtain a depth map with respect to the first camera based on the first image;
obtain a pose change from a first camera pose to a second camera pose based on the first image and the second image;
generate a set of additional pose changes based on the pose change, wherein generating the set of additional pose changes based on the pose change comprises sampling a Gaussian distribution centered at the pose change;
obtain a set of reconstructed images using the first image, the depth map, the pose change, and the set of additional pose changes;

match each reconstructed image of the set of reconstructed images with the second image; and select a camera pose change estimation from the pose change and the set of additional pose changes that corresponds to a best matching reconstructed image.

12. The system of claim 11, wherein the processor configured to match each of the reconstructed images with the second image is further configured to calculate a reconstruction loss for each of the reconstructed images.

13. The system of claim 12, wherein the best matching reconstructed image is defined by a lowest reconstruction loss.

14. The system of claim 11, wherein the second camera is the first camera with a changed pose.

15. The system of claim 11, wherein the processor is further configured to:

train a neural network that is configured to obtain the depth map with respect to the first camera based on the first image;

update parameters of the neural network based on determining that the selected camera pose change estimation and/or the best matching reconstructed image does not correspond to a predetermined condition; and iternatively return to the step of obtaining the depth map to obtain an updated depth map.

16. The system of claim 11, wherein the processor is further configured to:

train a neural network that is configured to obtain the pose change from the first camera pose to the second camera pose;

update parameters of the neural network based on determining that the selected camera pose change estimation and/or the best matching reconstructed image does not correspond to a predetermined condition; and iteratively return to the step of obtaining the pose change to obtain an updated pose change.

17. The system of claim 11, wherein the first image and the second image are captured from videos captured by the first camera and the second camera respectively.

18. The system of claim 11, wherein the camera pose change estimation and the depth map are used to map and localize robots.

19. The system of claim 11, wherein the first camera pose is a six-dimensional (6D) vector that includes three-dimensional (3D) location coordinates and three (3) angles for orientation of an object.

20. The system of claim 11, wherein the depth map is a two-dimensional (2D) matrix where each element of the 2D matrix depicts a depth of a corresponding three-dimensional (3D) point in the scene with respect to the first camera and the second camera.

\* \* \* \* \*